UNITED STATES PATENT OFFICE.

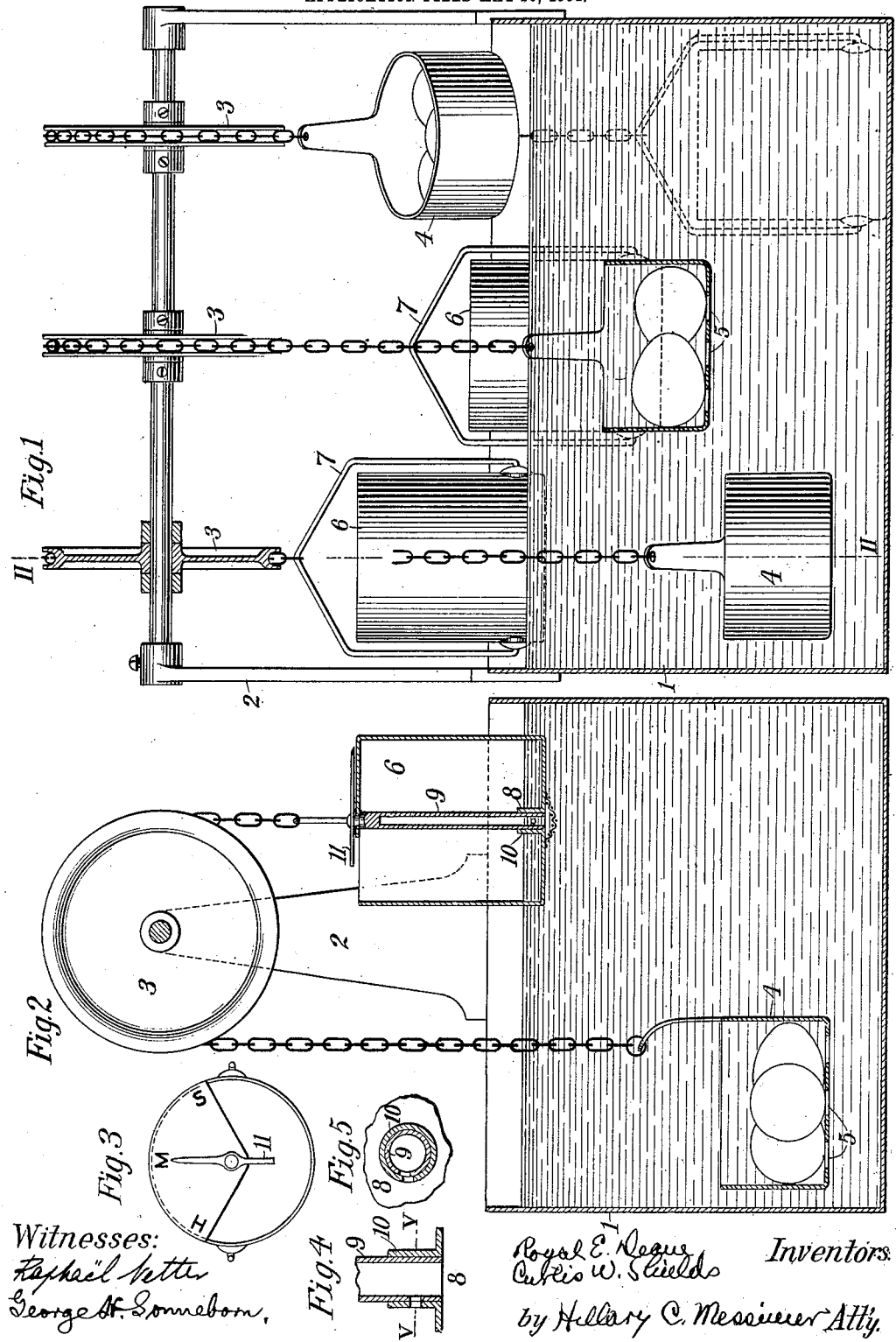

ROYAL E. DEANE AND CURTIS W. SHIELDS, OF NEW YORK, N. Y.; ELIZABETH S. DEANE, ROLLIN M. MORGAN, AND GEORGE W. WHEELER EXECUTORS OF SAID ROYAL E. DEANE, DECEASED.

EGG-BOILER.

No. 896,806.  Specification of Letters Patent.  Patented Aug. 25, 1908.

Application filed May 10, 1904. Serial No. 207,347.

*To all whom it may concern:*

Be it known that we, ROYAL E. DEANE and CURTIS W. SHIELDS, residing at 264 Water street, New York, N. Y., have invented certain new and useful Improvements in Egg-Boilers, of which the following is a specification, reference being had to the drawings accompanying and forming a part of the same.

Our invention relates to egg boilers of the type in which the eggs are automatically withdrawn from the water when they have been boiled the desired length of time, and to accomplish this object by means which are simple, inexpensive and reliable.

Referring to the drawings Figure 1 is a front elevation, partly in section. Fig. 2 is a section on the line II—II of Fig. 1. Fig. 3 is a plan view of the adjusting device. Fig. 4 is a vertical section of the valve controlled by the adjusting device, and Fig. 5 is a section thereof on the line V—V of Fig. 4.

1 is a hot water tank which supports the frame 2, on which frame independent wheels 3 are journaled. The egg container 4 has perforations 5 to facilitate its insertion into the water and it is connected by a flexible connection which passes over the wheel 3 to a counterbalance 6. This counterbalance is supported by a yoke 7, journaled below the center of gravity of the counterbalance can, so that when it is withdrawn from the water, it automatically tips over and empties and rights itself. The weight of the counterbalance when empty is slightly in excess of that of the egg container when the latter is filled to its capacity, so that the normal tendency of the counterbalance is to draw the egg container out of the water; but opposed to this excess of weight is the buoyancy of the counterbalance can, and in order to control the resultant of these two tendencies, I provide in the bottom of the counterbalance can an adjustable valve 8, which will allow water to slowly enter the can and control the length of time necessary to eliminate the buoyancy of the can by its becoming filled with water and allow the can to drop to the bottom of the hot water tank, thereby withdrawing the eggs.

In Fig. 1 a tank is shown containing three of our egg boilers in three different positions. In the position at the extreme right of Fig. 1 the eggs are ready to be inserted in the water. When they are inserted the counterbalance can is thereby lifted out of the water and automatically empties, and the apparatus then resumes the position shown in the extreme left of Fig. 1. The middle position shows the counterbalance tank gradually sinking into the water and lifting the egg-container therefrom. Obviously the regulation of the flow of water into the counterbalance can determines the length of time the eggs will be in the boiling water and by having an adjustable valve, we can automatically boil eggs, hard, medium or soft. Any form of valve can be used for this purpose, but in Figs. 3, 4 and 5, we have shown a simple and efficient device.

A hollow stem 9, open at its bottom to the water, is rotatable in a sleeve 10, which is integral with the bottom of the can. Each of these parts is provided with an opening adapted to register with each other, so that the valve is set in a position where the opening is at its maximum, the counterbalance can will sink rapidly, and the eggs will be soft boiled. By closing the opening more and more, the counterbalance tank will sink more and more slowly, and, therefore, the eggs will be boiled to the degree desired.

For convenience the stem of the valve may carry a pointer 11, so that the apparatus may be quickly and easily set to boil the eggs hard, medium or soft. We do not desire, however, to limit ourselves to the use of this adjusting device, for it will readily be seen that by having three boilers, as shown in Fig. 1, they may be permanently set to boil respectively hard, soft or medium eggs. Nor do we limit ourselves to the precise details of construction and arrangement shown in the drawings, as the same may be varied to a considerable extent without departing from the spirit of our invention, which consists in automatically boiling eggs by controlling the resultant counterbalancing effect of the normal force of gravity and buoyancy of the counterbalance can.

Having described our invention, what we claim is:

1. In an egg boiler, an egg holding device, a counterbalance vessel adapted to gradually fill and sink for lifting said device, connections between the two, and means whereby said vessel is automatically dumped when lifted out of water for the commencement of a new operation.

2. In an egg boiler, an egg holding device, a counterbalance vessel adapted to gradually fill and sink for lifting said device, connections between the two, and means whereby said vessel is automatically dumped when lifted out of water for the commencement of a new operation; said dumping means comprising a yoke or bail pivoted to said vessel at a point below its center of gravity when full of water.

3. In an egg boiler, an egg holding device, a counterbalance vessel weighted at its bottom adapted to gradually fill and sink for lifting said device, connections between the two, and means whereby said vessel is automatically dumped when lifted out of water for the commencement of a new operation; said dumping means comprising a yoke or bail pivoted to said vessel at a point below its center of gravity when full of water, and above its center of gravity when empty; whereby the weight of the water will tip the vessel over to empty itself upon which it rights itself.

In witness whereof we have hereunto set our hands in the presence of two witnesses this 25th day of March, 1904.

ROYAL E. DEANE.
CURTIS W. SHIELDS.

Witnesses:
EDW. B. BROOKS,
C. J. CORBISHLEY.